United States Patent [19]

Kapral

[11] 3,976,731
[45] Aug. 24, 1976

[54] METHOD OF DECORATING PLASTIC SURFACE BY TRANSFERABLE IMPRINT

[76] Inventor: Ales M. Kapral, c/o Akrasil Corp., P.O. Box 409, Menasha, Wis. 54952

[22] Filed: Mar. 12, 1975

[21] Appl. No.: 557,650

Related U.S. Application Data

[60] Division of Ser. No. 387,543, Aug. 10, 1973, which is a continuation of Ser. Nos. 236,839, March 28, 1972, abandoned, and Ser. No. 359,474, May 11, 1973, abandoned, each is a continuation-in-part of Ser. No. 156,338, June 24, 1971, abandoned.

[52] U.S. Cl. .............................. 264/46.4; 249/112; 249/127; 264/54; 264/259; 264/293; 425/812
[51] Int. Cl.² ........................................ B29D 27/04
[58] Field of Search .............. 264/54, 51, 293, 259; 428/153, 40

[56] References Cited
UNITED STATES PATENTS

| | | | |
|---|---|---|---|
| 3,124,627 | 3/1964 | Hood | 264/54 |
| 3,431,331 | 3/1969 | Pincus et al. | 264/54 X |
| 3,493,449 | 2/1970 | Krug | 264/54 X |
| 3,533,899 | 10/1970 | Kapral | 428/40 |
| 3,844,523 | 10/1974 | Wilheim | 249/113 |
| 3,895,154 | 7/1975 | Kapral | 264/51 X |

*Primary Examiner*—Philip Anderson
*Attorney, Agent, or Firm*—Mason, Kolehmainen, Rathburn & Wyss

[57] ABSTRACT

A sheet of organic material having a creped or ridged formation is first coated with a film of silicone resin and then overcoated with a layer of a flexible organic resin. Both coatings conform to the ridged surface. The sheet is positioned inside a mold cover. When a plastic mixture is foamed, the top surface of the molded object contacts the flexible organic material on the surface of the sheet and adheres thereto. When the cover is removed, and the sheet peeled off, the molded article has its top surface decorated with the flexible organic sheet material.

5 Claims, 3 Drawing Figures

METHOD OF DECORATING PLASTIC SURFACE BY TRANSFERABLE IMPRINT

This is a division, of application Ser. No. 387,543, filed Aug. 10, 1973 which in turn is a continuation of my copending application Ser. No. 236,839, filed Mar. 28, 1972 and now abandoned and Ser. No. 359,474, filed May 11, 1973 and now abandoned. Applications Ser. No. 236,839 and 359,474 are each a continuation-in-part of my application Ser. No. 156,338, copending therewith, and filed June 24, 1971 and now abandoned.

This invention relates to a gas-release sheet adapted to be positioned inside the cover of a hollow three-dimensional mold to provide means for venting entrapped gases to the atmosphere and to apply a graphic or decorative design to the surface of the molded article produced in the mold in contact with the sheet. More particularly, this invention relates to a sheet of organic material having a creped or ridged formation on one surface thereof, said surface being coated with a film of silicone resin to which is applied a film of thermoplastic resin, both films conforming to the surface of the sheet material so that the creped or ridged formation forms a series of valleys or channels running transversely across the coated surface of sheet to allow gas to escape from the mold during the formation of a foamed plastic three-dimensional object.

BACKGROUND OF THE INVENTION

In my copending application Ser. No. 359,474 there is described a sheet of organic material having a creped or ridged formation on one surface thereof, said surface being coated with a film of thermoplastic resin conforming to the surface of the sheet of organic material wherein the creped or ridged formation forms a series of valleys or channels running transversely across the sheet, whereby entrapped air and other gases within a mold can be released to the atmosphere when the sheet is placed inside the cover of the mold with the creped or ridged surface in contact with the contents of the mold. If a foamed plastic object is produced in the mold, it fills the mold and conforms to the shape thereof. Air and other gases within the mold can escape via the furrows or grooves in the sheet, thus allowing the foamed object to completely fill the mold and avoid imperfections due to bubbles entrapped therein.

Prior attempts to allow for the lateral escape of gas under the mold cover have been directed to providing intersecting channels in the mold cover itself (see Einhorn U.S. Pat. No. 3,163,687). As explained in the Einhorn patent, channels in the mold cover which extend to the periphery of the cover have caused the additional problems of foam breakdown which creates hard horny regions where the foam cells have collapsed. Einhorn, for example, employs gas venting in the cover to avoid this problem but does not provide a way to allow for lateral escape of gas to the mold periphery without creating hard horny regions in the foamed product.

Mold cover holes are less desirable as a means of venting entrapped gas from the mold since foam may expand into the holes and create a non-uniform surface. However, until applicant's invention, no one has solved the problem of providing for the lateral escape of gas from the inside of a mold when foaming a foamable plastic material and at the same time avoid the problems of a non-uniform surface and foam cell breakdown.

Applicant has found that a flexible mold cover liner of specific dimensions allows for the lateral escape of gas from under a mold cover without creating the above-mentioned problems. The liner can be described as a series of ridges and valleys or furrows wherein the distance between adjacent ridges or between furrows or channels is from 0.3 mm. to 4 mm. and the depth of each groove or furrow is 0.1 mm. to 1.0 mm. These measurements are critical in achieving the lateral escape of gas without the adverse effects of foam cell breakdown and a non-uniform surface as explained above.

When paper is used, it is preferable to have a series of shorter ridges so that adjacent grooves or furrows are interconnected. This can be done by creping the paper, as known in the paper art as set forth below, to provide a series of ridges having a length of from 1.0 mm. to 30 mm., preferably 2.0 mm. to 22 mm. with a preferred average ridge length of about 7.0 mm.

Preferably, the distance between adjacent ridges or between furrows in applicant's mold liner is from 0.6 mm. to 1.2 mm. with an average distance of about 0.865 mm. The depth of each groove or furrow is preferably from 0.13 mm. to 0.38 mm. with an average depth of about 0.258 mm.

This system of ridges and valleys drains must end with a clear opening at the edge of the sheet disregarding how the sheet is cut. In other words, each drain or channel must have two open ends, one at each edge of the sheet. Further, those drains or channels preferably should not run straight because gases could escape too freely without the ability of maintaining the certain pressure needed for perfect foam production. Deviation to left and right in a zig-zag pattern is preferred.

While other materials can be used, paper is preferred because of the low price and ease in forming a system of ridges and valleys. Such system can be obtained for instance by embossing but in this case, the height of ripples or depth of valleys is rather limited.

Another method is creping, especially dry creping, so-called Micrexing, described in the Walton U.S. Pat. Nos. 2,761,490, 2,915,109, 3,066,046, 3,220,056, 3,220,057 and 3,260,778. This method allows a prior application of a releasing agent such as polyethylene and/or silicone.

The present invention relates to an improvement thereon wherein the film of flexible resin has a decorative or graphic design applied thereon, which design is transferred to the foamed plastic object in the mold, thus producing a three-dimensional plastic object with a graphic or ornamental design on the surface adjacent the cover of the mold.

In accordance with this invention a sheet of rippled or creped paper or similar organic sheet material coated with a thin layer of silicone resin conforming to the rippled or creped surface of the sheet material and then coated with a layer of a thermoplastic resin is used as the base material for printing or decorative design applied to the surface of the thermoplastic resin film. As disclosed in my U.S. Pat. No. 3,533,899 of Oct. 13, 1970, rippled or creped paper and similar organic material are particularly desirable for printing stock because the printing thereon is especially sharp and clear and the coverage is excellent. The printed material is uniformly darker and denser than on similar paper without the creped or rippled surface. In addition, these products are easier to cut and trim than conventional adhesive coated paper products. Therefore, when printing is applied to the thermoplastic resin, especially good characters and designs are formed.

OBJECTS OF THE INVENTION

It has long been desired and it is an object of this invention to provide a sheet material which is able to conduct gases out of the mold under a relatively small gas pressure and concurrently apply an artistic or decorative design to the surface of the foamed plastic object adjacent to the sheet material under the cover of the mold.

It is another object of this invention to provide a film coating on the creped or rippled sheet material bearing a decorative or ornamental design thereon.

It is a further object of this invention to provide a decorative or ornamental design on a flexible resin film on a creped or rippled sheet which film of flexible resin later becomes an integral part of the foamed plastic body produced in contact with the thermoplastic film and is transferred from the sheet to the molded object.

A further object of this invention is to obtain in one operation a fully decorated sixth side of a molded foamed plastic object in any color.

A further object is to obtain such decorated part either flat or embossed with imitation wood grain grooves.

These and other objects are apparent from and are achieved in accordance with the following disclosure, taken in conjunction with the drawing.

DESCRIPTION OF THE DRAWING

As shown in FIG. 1, a sheet of organic material such as paper having furrows or grooves 11 embossed or creped therein which produce a rippled surface on one side of the sheet is coated on the rippled surface with a thin film of silicone resin 12 which is of relatively small thickness in respect to the size of the grooves or furrows 11 in the sheet 10 and which conforms closely to the convolutions on the surface of said sheet. A second layer of flexible resin 13 is applied to and corresponds to the film 12. The second or outer film 13 can be printed on or otherwise decorated or designed.

As illustrated in FIG. 2, the sheet of creped organic material 10 is placed inside the top cover 17 of a mold 14 lined with a flexible material 15 such as rubber or flexible plastic having a three-dimensional design 16 on the inner surface thereof. When components of a foamed plastic (e.g., polyurethane) are placed in the mold, the plastic expands with gas formation and fills the mold. The air and other gases in the mold escape via the furrows or grooves 11 in the sheet 10 and the foamed plastic rises to contact the film of flexible resin 13 on the sheet 10. When such sheet material is used in a three-dimensional mold in which a three-dimensional foamed plastic body is produced, the rippled or creped surface of the sheet material allows the gas to escape from the mold as described in my application Ser. No. 156,338 filed June 24, 1971 and now abandoned. The plastic material in foaming expands and fills all of the mold and comes in intimate contact with the creped or rippled sheet material inside the cover of the mold. The sheet material is so oriented so that the rippled or creped surface is facing the inside of the mold and the foamed resin in expanding comes in contact with said surface and particularly in contact with the surface of thermoplastic resin which is applied to the creped or rippled sheet.

Figure 1:
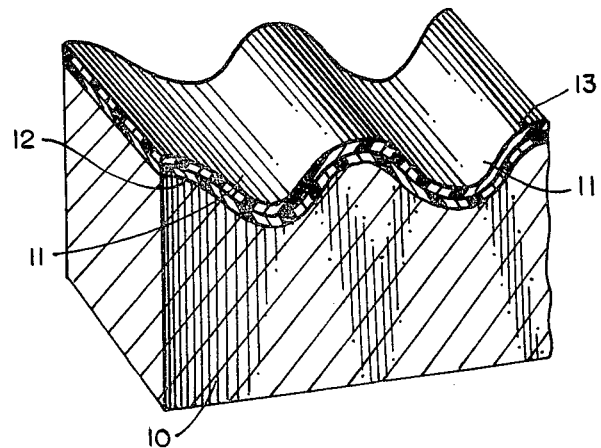
FIG. 1 is a cross-sectional view of a sheet of creped organic material in accordance with this invention.
Figure 2:
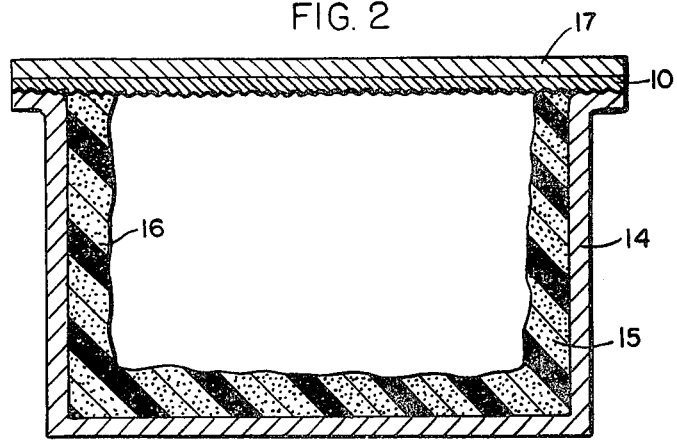
FIG. 2 illustrates a conventional mold closed with a conventional cover with a sheet of creped material, made in accordance with this invention, disposed inside the cover.
Figure 3:
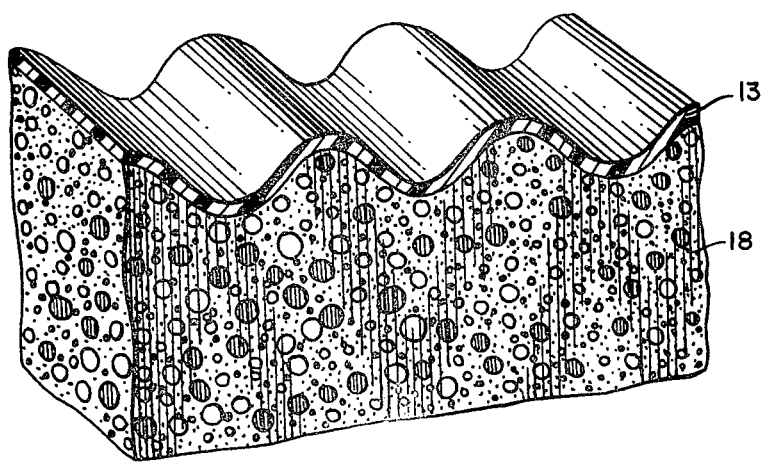
FIG. 3 represents a three-dimensional object of foamed plastic to which the film of flexible resin constituting the outer surface of the creped or rippled sheet has become an integral part of the foamed plastic object, carrying with it the graphic or ornamental design which had been on the surface of the flexible resin film on the sheet material.

When the cover 17 of the mold and the sheet 10 are removed, the flexible resin film 13, which has become intimately bonded to the foamed plastic 18 during the formation of the latter in the mold, remains on the surface of the foamed object 18, forming a new surface thereon with the graphic or ornamental design which was applied to the film 13 now transferred to the foamed object 18.

Under the conditions which exists in the mold during the production of a three-dimensional foamed object, the resin of flexible film 13 on the sheet material 10 becomes intimately bonded to and an integral part of the foamed resin body. The design on the flexible resin film 13 is likewise transferred to the foamed resin body 18 and is tenaciously bonded thereto. A further advantage of this operation is that the design or printed material is now covered by the film of thermoplastic resin and is protected from the atmosphere and scratching and abrasion by external objects, thus making the design more durable and long-lasting. The foamed resin objects when removed from the mold not only has the ornamental design created by the mold but the sixth side, which ordinarily is pitted with voids and bubbles and forms an undesirable surface, is now neatly ornamented and completely devoid of defects because of the provision of a means for egress of gases developed within the mold. Thus, the object so molded is ready for use without further treatment.

In practical application, it is desirable to select a proper cellulosic sheet of basis weight between 60–200 lbs. per ream, preferably 180 lbs. per ream, of porosity between 20–300 seconds, preferably 120 seconds. The release coating can be a fluorocarbon or silicone composition such as described in my U.S. Pat. No. 3,575,917 or one of the commercial silicone release coatings such as Dow Corning XC–4–2125, Syl-Off 23 or Syl-Off 291. Also, a fatty acid chromium complex can be used as a releasing agent.

It is possible to coat such a sheet with silicone from water emulsion such as Dow Corning, Syl-Off 22 or with a solvent solution of silicone polymer introduced in previous paragraph. Water emulsions by virtue of wetting paper fibers require harsh drying adversely affecting the porosity. Therefore, a solvent solution of a curable silicone polymer with an appropriate catalyst is preferred. For silicone solutions in organic solvents a 20% solids is the preferred concentration, although 2–100% solids solution can be applied. Coating can be done by any coating method such as air-knife, gravore roller, etc.; preferred is wire rod application. Cure time is between 3 seconds to 3 minutes, preferably 15 seconds.

Such releasing sheet coated with high solids silicone and with open pores is in a following operation overcoated with interrupted (porous) film which must partially adhere to the releasing surface as to be able to withstand handling, shipping and printing without rub-off. It was found that variety of different lacquer forming organic materials can be used.

Preference is given in the case of polyurethane foam to a solvent coating based on an aliphatic polyurethane elastomeric compound which does not contain any free reactive isocyanate group. Such lacquer (supplied as Alfa-841 by Baker Urethanes, The Baker Castor Oil Company, Bayonne, N.J.) forms from a 20% solids solution an uninterrupted flexible film which is non-porous and forms an adequate conductor for air and gases. When it is desired that the flexible film be porous, the addition of supercolloidal silica, such as Carbosil from Cabot Corporation, administered between 0.01–3% based on the weight of the wet composition, is preferred. When the same method is used in Formica (urea-formaldehydephenolformaldehyde laminate) application a thermosetting melamine-ureaformaldehyde lacquer in alcoholic media is used or an ethyl cellulose solution in an aliphatic solvent or a vinyl chloride polymer solution. In any case, the releasing sheet should be over-coated with lacquer at between 0.2–6 lb. solids per thousand square feet. Such dry coating should be easily removable by any sticky surface, for instance, Scotch tape. When in contact with foamed plastic in formation it should transfer clearly from release sheet.

In the final operation, the flexible film applied on the silicone-coated surface can be printed with conventional printing inks with one or more color prints of wood grain or any other patterns. There is, of course, the alternative of substituting over-coating with direct print with printing ink containing a vehicle as described above. If instead of over-coating a flat sheet, a rippled, wood grain-embossed or creped surface (as described in my copending application Ser. No. 156,338) is over-coated, then the print corresponding to the embossing pattern can produce a very realistic effect of natural wood or other artistic design.

A fiberglass technique can also be used with this invention by forming panels with the aid of fiberglass plus resin sprayed over the surface of above-described release printed sheet.

What is claimed as new and desired to be secured by Letter Patent of the United States is:

1. In the method of producing three-dimensional objects of foamed plastic material which comprises the steps of introducing a thermosetting plastic reaction mixture containing a blowing agent into a mold cavity, closing the mold cavity with a cover, and permitting said reaction mixture to foam and cure and blowing agent to form a three-dimensional foamed plastic object within said mold, the improvement which comprises attaching a sheet of organic material on the inside of the cover, said sheet having a creped or ridged formation on the surface away from said cover, said surface being coated with a first film of silicone resin and a second film of flexible organic resin both of which conform to the surface of the sheet of organic material, the creped or ridged formation forming a series of valleys or channels running transversely across the sheet wherein the distance between channels is from 0.3 mm. to 4 mm. and the depth of each groove or furrow is from 0.1 mm. to 1.0 mm., whereby entrapped air and other gases within the mold are released to the atmosphere through said valleys or channels while said reaction mixture is transformed into a foamed object which substantially fills said mold, thereby forming a composite foamed plastic object conforming to the interior surfaces of said mold and to the surface of said organic resin film, without voids or bubbles caused by entrapped gases in the mold, the surface of said foamed plastic object being formed of the flexible organic resin film on said sheet of organic material, which film is integrally bonded to said foamed plastic object.

2. The method of claim 1 wherein the sheet of organic material is paper.

3. The method of claim 2 wherein the second film is formed from a thermoplastic resin.

4. The method of claim 3 wherein the film of flexible resin has printed or applied thereon decorative or written material such that the decorative or written material is located on the undersurface of the flexible resin film when said resin film is transferred to the foamed plastic object.

5. The method of claim 3 wherein the thermoplastic film is polyethylene.

* * * * *